Figure 1:
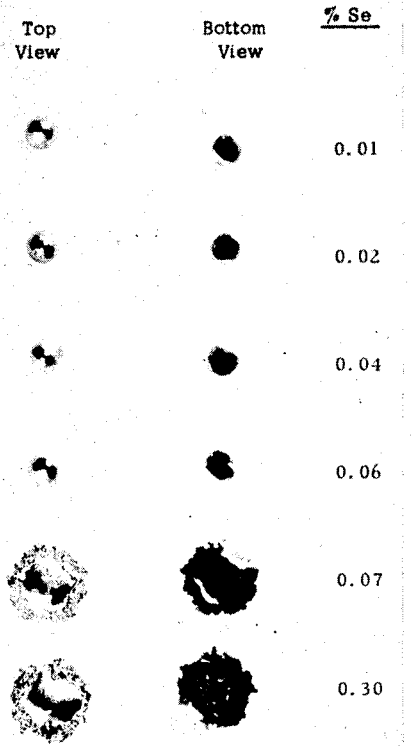

United States Patent

[11] 3,557,340

| [72] | Inventor | Pramod Kumar Srivastava<br>Kenmore, N.Y. |
|---|---|---|
| [21] | Appl. No. | 813,685 |
| [22] | Filed | Apr. 4, 1969 |
| [45] | Patented | Jan. 19, 1971 |
| [73] | Assignee | Union Carbide Corporation<br>New York, N.Y.<br>a corporation of New York |

[54] SELENIUM BEARING WIRE FOR STEEL WELDING
3 Claims, 2 Drawing Figs.

[52] U.S. Cl. .................................................. 219/137,
75/123; 117/202; 219/146
[51] Int. Cl. .................................................. B23k 9/00
[50] Field of Search.......................................... 219/137,
145, 146; 75/123, 134.11; 117/231, 202—206;
252/512; 29/196.5

[56] References Cited
UNITED STATES PATENTS

| 1,967,872 | 7/1934 | Doan.......................... | 219/145 |
| 2,009,714 | 7/1935 | Palmer........................ | 75/123 |
| 3,192,039 | 6/1965 | Goda, Jr...................... | 75/128 |
| 3,303,319 | 2/1967 | Steigerwald.................. | 219/121 |

*Primary Examiner*—J. V. Truhe
*Assistant Examiner*—C. L. Albritton
*Attorneys*—Paul A. Rose, Thomas I. O'Brien, Dominic J. Terminello and Eugene Lieberstein ABSTRACT: The addition of .04—3 percent-wt. of selenium to any ferrous filler wire composition improves the wettability property of the weld metal and substantially eliminates undercut.

SELENIUM BEARING WIRE FOR STEEL WELDING

This invention relates generally to gas shielded electric arc welding and more particularly to an improved filler metal wire and to a method of inert gas shielded electric arc welding employing the improved filler metal wire as an electrode.

Two properties of liquid metal that are important in welding, particularly in gas shielded electric arc welding, are viscosity and surface tension. In welding, there is a tendency for the liquid weld metal to draw away from and not wet or flow out to the fusion line leaving depressions along the edges of the weld known in the art of welding as undercut. This property as well as others, e.g. weld smoothness, weld appearance, spatter, etc., have been shown to be a function of the surface tension of the fused weld metal. Ordinarily, some of the finished weld metal properties may be materially influenced by the introduction of oxygen or carbon dioxide to the inert shielding gas medium. Oxygen or carbon dioxide affects the metal transfer characteristics changing the penetration pattern and also the wetting behavior of the weld puddle, promoting the flow of weld metal along the fusion edges. However, the addition of oxygen or carbon dioxide may cause the gas shielding medium to become oxidizing. This can cause porosity in some ferrous metals and may also cause some loss of certain alloying elements such as chromium, vanadium, aluminum, titanium, manganese, and silicon.

It has been demonstrated that the wettability of ferrous metals may also be increased by the addition of certain metals to the filler wire. In particular it has been discovered, in accordance with the present invention, that the judicious addition of selenium to the filler wire will materially reduce the surface tension of the liquid weld metal, thereby increasing the wetting tendency of the weld puddle. Furthermore, it has been observed that the presence of selenium in a given shielding atmosphere lowers the minimum transition current required to to maintain a "spray-type mode of metal transfer." For the purpose of this disclosure a "spray-type mode of metal transfer" is characterized by the continuous formation and discharge of minute droplets of molten metal at the tip of the electrode which are projected with great force in line with the electrode to the workpiece. To establish spray transfer, the welding current must be raised above a critical level known as the transition level. Below the transistion level metal will transfer in a "globular" fashion. This type of metal transfer is characterized by large droplets of molten metal which form at the tip of the electrode and fall primarily under the influence of gravity.

Moreover, the addition of selenium as a wetting agent provides greater flexibility in the use of oxygen and carbon dioxide so that their detrimental affects can be minimized.

It is therefore the principal object of the present invention to provide an improved filler metal wire which will enhance the wettability characteristic of the weld puddle thereby substantially eliminating undercutting in the finished weld.

It is a further object of the present invention to provide a method of inert gas shielded welding employing a consumable filler wire electrode containing an additive of predetermined amount to improve the contour of the finished weld metal.

It is a further object of the present invention to provide a filler wire for inert gas shielded welding which contains at least .04 percent-wt. selenium.

A full and complete description of this invention follows with reference to the attached drawings:

FIG. 1 provides a top and bottom plan view of solidified sample droplets containing various concentrations of selenium to illustrate its wetting tendency.

Figure 2:
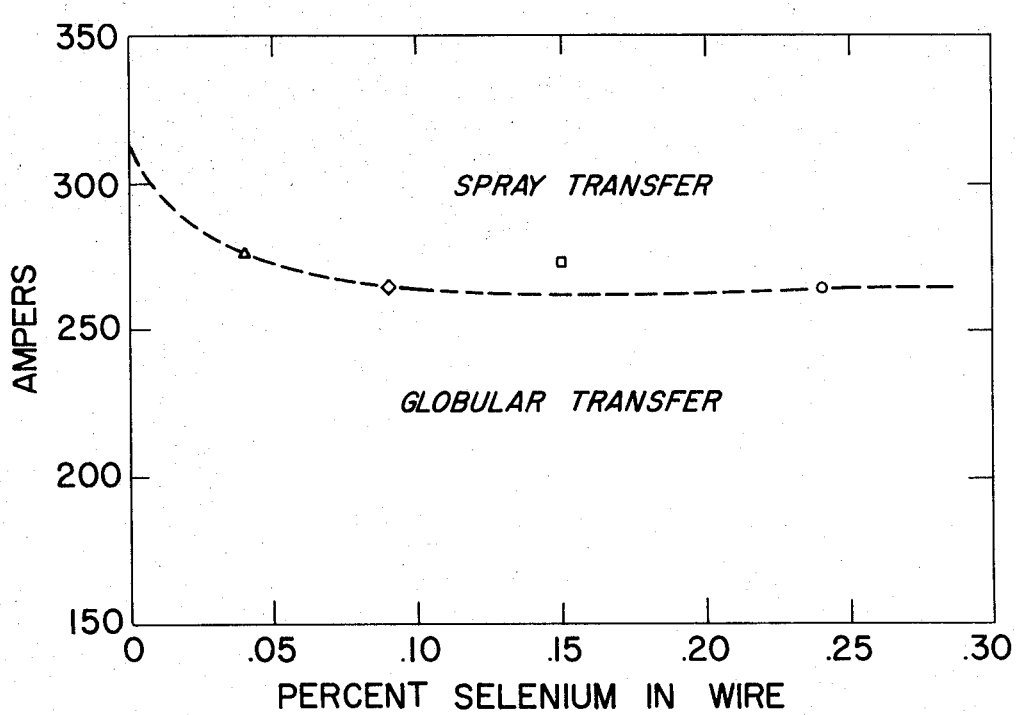

FIG. 2 is a graph showing the effects of variations in arc current and selenium content on the mode of metal transfer.

The present invention was discovered during a systematic investigation of the effects of trace additives on weld metal surface tension. The surface tension of liquid weld metal can be altered by changing the composition of the liquid phase. It was observed that a change in surface tension via metal addition effected the wetting characteristics of the molten metal which seemed particularly sensitive to selenium. In order to study the effect observed by the addition of selenium, under controlled atmospheres, a technique of levitation-quenching was evolved. Conventional levitation-quenching apparatus was used which consisted of a levitation melting unit enclosed within a vacuum-tight chamber that could be evacuated and refilled to a given pressure with gas of a desired composition. The specimen to be melted was inserted into the levitation coil where it was heated until molten, then permitted to fall freely upon a prepared substrate beneath the levitation coil where the specimen was cooled until it solidified. The entire cycle of heating, melting, cooling, and solidifying took place under a controlled 100 percent argon atmosphere, although any inert gas atmosphere may be employed.

The specimens taken for the levitation-quenching experimental runs were obtained using welding wire of nominal composition carbon (C) - .09, magnanese (Mn) - 1.00, silicon (Si) - .50, sulfur (S) - .024, phosphorous (P) - .017, and balance iron (Fe) as the base composition. Initially, the wire was melted in an induction furnace. The alloying addition of an appropriate amount of selenium was then made by suitably wrapping the charge in steel foil and immersing it in the bath. After selenium was distributed uniformly in the bath, molten metal was sucked into a vycor tube where it solidified as a rod. Such rods were cleaned thoroughly and cylindrical pieces weighing one gram were cut out. These pieces were taken as specimens for the levitation-quenching runs. The various experimental parameters, such as the temperature of the molten drop, distance between the levitation coils and the substrate, weight of specimens, substrate surface finish, etc. were chosen after trial runs in order to yield the maximum sensitivity. The chosen values of these parameters were kept constant during each run and the amount of spreading of the molten drop taken as a measure of "wettability." Primary selenium additions at levels of 0.01, 0.02, 0.04, 0.06, 0.07 and 0.30 wt.-percent Se were investigated. The results of this investigation are shown in FIG. 1 which clearly demonstrates the improvement in "wettability" with increased concentrations of selenium wherein the greatest improvement occurs at about 0.07 wt.-percent selenium (Se).

To confirm the improvement in the wetting characteristic caused by selenium addition, as observed during the levitation-quenching experimental runs, a number of bead-on-plate deposits were made from wires fabricated with various levels of selenium content. The same base composition, namely, "C - .09, Mn - 1.00, Si - .50, S - .024, P - .017, balance iron" was used. Although a wire of equivalent base composition was chosen it is to be understood that any commercially available ferrous wire composition would obviously be affected by selenium addition in a similar manner. The alloy constituents in a ferrous filler wire are chosen for their metallurgical compatibility in any given application. Their effect on wettability is known to be minimal. Therefore, the enhanced wetting effect due to the addition of selenium in this disclosure is believed representative of the effect of selenium in any low carbon steel composition.

Experimental welding wires were fabricated with different levels of selenium content. The master ingots were obtained by melting the constituent elements in a plasma-arc furnace. A plasma-arc furnace which is typical of the type employed is fully described in U.S. Pat. No. 3,147,330. The ingots were then fabricated in one-sixteenth inch diameter copper coated wires following well known commercial forging, rolling, and wire drawing procedures. The ease in which these welding wires were fabricated is significant since other known additives make the wire drawing operation impossible.

The bead-on-plate deposits were made using the basic MIG welding process, i.e. a selenium-bearing experimental wire fabricated in accordance with the procedure outlined above was fed through a torch while the weld area was blanketed with a shielding gas. In order to maintain a stable arc it was found necessary to add a trace of oxygen or carbon dioxide to the otherwise inert shielding atmosphere. In the complete absence of oxygen, it was not possible to maintain a steady, spatter-free arc no matter how much selenium was added to the wire. However, the amount of oxygen required is much less when selenium is present in the wire than would be necessary using conventional wires substantially free of selenium; in fact, a highly stable spatter-free arc can be obtained with a shielding gas having as little as .25 percent $O_2$ by volume with a balance of high purity monatomic inert gas. A reduction in the oxygen content in the shielding gas to a trace level prevents the formation of metal oxides to any appreciable degree.

The bead-on-plate deposits exhibited enhanced wettability characteristics comparable to that observed during the levitation-quenching experiments. It was further observed that the presence of selenium in the welding wire above a predetermined amount has the affect of reducing the minimum transition current necessary to maintain the spray-type mode of metal transfer to a substantially constant level. The graph shown in FIG. 2 demonstrates that the current level necessary to maintain the spray-type mode of metal transfer drops substantially as the selenium content is increased to about .04 wt.-percent and then levels off to a substantially constant value. This means that a welding wire containing at least .04 wt.-percent selenium will insure a relatively flat transition level for the particular welding operation being performed.

In order to fully substantiate the findings of the levitation-quenching tests and the bead-on-plate deposits and to determine the preferred range for overall effectiveness, under different welding conditions, a number of welding tests were conducted. The results of these tests are evidenced by the following examples.

EXAMPLE A

Multipass 60 degree Vee welds were made joining 1 inch thick low carbon steel plate using a one-sixteenth inch diameter welding wire and a selenium-containing wire of similar base compositions. These were done by the inert gas shielded consumable electrode technique with direct current reverse polarity power at a linear speed of 12 in./min. The shielding gas employed was ½ percent oxygen in argon. The tests and their characteristics are reported in the following table.

TABLE A

| Weld wire composition | Current | Voltage | Characteristics | |
|---|---|---|---|---|
| | | | Welding process | Finished weld |
| Without Se | 300 | 28 | Mixed spray and short arc type metal transfer. Unsteady, spattery and noisy arc. | Wavy bead; presence of undercut; poor wettability; mounted contour; unsound, unacceptable weld. |
| With 0.08 Se | 300 | 28 | Spray type transfer; steady, quiet arc | Excellent bead; no undercut; good wettability; flat contour; good acceptable weld. |

These welding tests demonstrate that the addition of selenium, according to the invention, to a ferrous welding composition, greatly improves the ease of electric welding in terms of maintaining the desirable steady, nonspattery arc, spray-type of metal transfer and that the deposited metal is sound in terms of lack of voids and undercut when the shielding atmosphere is less oxidizing than is normally employed.

EXAMPLE B

A series of single pass fillet welds was made of ⅜ inch steel plate 90° to ⅜ inch steel base plate with the Vee oriented for vertical wire feed. In this series, the shielding gas composition was Argon-½ percent Oxygen while using one-sixteenth inch dia. welding wires of differing selenium content. Table B lists the tests of this series showing the selenium content of the otherwise typical commercial steel welding wire, the amperes welding current and the observed characteristics of the finished welds. These were DCRP, MIG welds at 12 i.p.m. carriage rate, no preheat and 50—60 c.f.h. gas flow rate.

TABLE B

| Wt. percent Se in wire | Current, amp | Finished weld characteristics |
|---|---|---|
| 0 | 300 | Entire length of weld has grossly irregular contour and edges are very undercut. |
| .04 | 290 | Part of weld is smooth in contour and without undercut and part is moderately irregular in contour with moderate undercut. |
| .09 | 295 | Entire length of weld has smooth contour and undercut is absent. |
| .15 | 290 | Excellent weld as is the .09 test. |
| .29 | 290 | Do. |

These tests show that when using less oxygen in the shielding gas than is effective for good MIG welding with a typical commercial steel welding composition, the addition of about 0.04 to 0.3 weight percent selenium improves the weld contour and undercut characteristics.

EXAMPLE C

A series of single pass fillet welds was made with the same set up as described in Example B except that the welding wire selenium content was constant at 0.29 wt.-percent and the oxygen content of the Argon shielding gas was varied. Table C lists the tests of this series showing the oxygen content of the shielding gas, the welding current and the observed characteristics of the finished welds.

TABLE C

| Vol. percent oxygen | Current, amp | Finished weld characteristics |
|---|---|---|
| 0 | 325 | Weld has grossly irreglar contour with considerable weld metal spatter. |
| ⅛ | 285 | Weld has good contour with irregular though not undercut edges plus some spatter. |
| ¼ | 280 | Weld has good contour with slightly irregular though not undercut edges and is spatter free. |
| ½ | 290 | Weld has excellent contour, no undercut and no spatter. |

These tests show that when selenium is present in MIG steel welding wire within the range of this invention substantially spatter free welds of good contour without undercutting can be obtained when the oxygen content of the shielding gas is a low as one-fourth volume percent. The good contour and freedom from spatter is believed to be the result of the combined effects of selenium addition and oxygen within the ranges of this invention on both the wettability of the weld metal and the arc stability.

Although pure oxygen in trace quantities was added to the shielding gas medium in the above tests, the oxygen may be supplied in other forms to the arc atmosphere, such as for example, by adding carbon dioxide in the proportion of approximately two moles of carbon dioxide to every mole of oxygen.

The preferred range of selenium addition to any ferrous filler wire to achieve maximum wettability and for overall welding effectiveness falls in the range of between .04—.3 percent by weight. The presence of oxygen or carbon dioxide in the shielding gas will permit a reduction in the requisite amount of selenium addition. Less than .04 percent-wt. selenium has only a nominal effect on wetting while an amount sufficiently greater than .3 percent-wt. selenium may have an adverse effect on weld soundness due to contamination.

In summary, the addition of selenium to any ferrous filler wire composition will increase wettability and improve the weld metal contour by eliminating undercut. In addition, the minimum drop-spray transition current for maintaining the spray-type mode of metal transfer is appreciably lower. Moreover, the addition of selenium to the welding wire decreases the amount of oxygen otherwise necessary in MIG welding to maintain a stable arc to that of only trace levels reducing the probability of oxide formations and porosity.

I claim:

1. A method of joining materials by arc welding said materials with a consumable ferrous electrode comprising: discharging a stream of shielding gas consisting essentially of a commercially pure inert gas and an oxidizing gas having the effect of at least one-eighth volume percent oxygen but less than one-half volume percent oxygen against said materials to be joined, striking an arc in such gas shielding stream to form a weld puddle, and feeding said ferrous electrode into said puddle characterized in that said ferrous electrode includes at least .04 percent-wt. selenium for substantially eliminating undercut.

2. A method of joining materials as defined in claim 3 wherein said ferrous electrode comprises:

C, .03–2% wt.
Si, .1–1.2% wt.
Mn, .5–2% wt.
Se, .04–.3% wt.
Balance, iron

3. Gas shielded metal arc welding which comprises discharging a stream of shielding gas against a steel workpiece to be welded, striking an electric welding arc in such gas shielding stream and feeding a bare metal wire electrode into such arc, characterized in that the shielding gas consists of a mixture of commercially pure argon with less than about one-half percent oxygen and such electrode wire is composed of by weight:

C, .03–2%
Si, .1–1.2%
Mn, .5–2%
Se, .04–.3%
Balance, iron